United States Patent
Marka et al.

(10) Patent No.: US 9,944,541 B2
(45) Date of Patent: Apr. 17, 2018

(54) SYSTEM FOR CLEANSING ORGANISMS FROM WATER

(71) Applicant: The Trustees of Columbia University in the City of New York, New York, NY (US)

(72) Inventors: Szabolcs Marka, New York, NY (US); Imre Bartos, New York, NY (US); Zsuzsanna Marka, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 717 days.

(21) Appl. No.: 14/222,457

(22) Filed: Mar. 21, 2014

(65) Prior Publication Data
US 2014/0202961 A1    Jul. 24, 2014

Related U.S. Application Data

(63) Continuation-in-part of application No. PCT/US2012/056515, filed on Sep. 21, 2012.
(Continued)

(51) Int. Cl.
*C02F 1/36* (2006.01)
*C02F 1/00* (2006.01)

(52) U.S. Cl.
CPC ............ *C02F 1/36* (2013.01); *C02F 1/008* (2013.01); *C02F 2201/009* (2013.01); *C02F 2209/005* (2013.01); *C02F 2303/04* (2013.01)

(58) Field of Classification Search
CPC ..... B01J 19/10; C02F 1/36; C02F 1/50; C02F 2103/008; C02F 2103/42; C02F 2209/005
See application file for complete search history.

(56) References Cited

U.S. PATENT DOCUMENTS

| 3,633,199 A | 1/1972 | Curry et al. |
| 4,942,868 A | 7/1990 | Vago |

(Continued)

FOREIGN PATENT DOCUMENTS

| CN | 204104570 | 1/2015 |
| WO | 2004041314 | 5/2004 |

(Continued)

OTHER PUBLICATIONS

ISA/US, "International Search Report and Written Opinion for the corresponding PCT application #1256515", dated Dec. 4, 2012, pp. 17.

(Continued)

*Primary Examiner* — Walter D Griffin
*Assistant Examiner* — Cameron Allen
(74) *Attorney, Agent, or Firm* — Eugene J. Molinelli; Beusse Wolter Sanks & Maire PLLC

(57) ABSTRACT

Techniques for depleting target organisms in water include a waterproof transducer configured for ensonifying a container of water with low intensity sound at one or more ultrasound frequencies for a duration sufficient to prevent maturation of at least 90% of the target organism. In some cases the target organism is mosquito larvae. For example, a portable system for depleting target organisms in water includes a control system and a plurality of waterproof transducers. The system is configured for ensonifying a surface layer of water in an acoustic frequency range from about 40 kilohertz to about 100 kilohertz and in a power concentration range from about 35 milliwatts per milliliter to 100 milliwatts per milliliter for a duration in a range from about 1 to about 100 seconds.

13 Claims, 16 Drawing Sheets

Related U.S. Application Data

(60) Provisional application No. 61/923,745, filed on Jan. 5, 2014, provisional application No. 61/537,569, filed on Sep. 21, 2011.

(56) References Cited

U.S. PATENT DOCUMENTS

| | | | |
|---|---|---|---|
| 5,048,520 | A | 9/1991 | Vago |
| 5,343,652 | A | 9/1994 | Johnson |
| 5,611,993 | A | 3/1997 | Babaev |
| 5,616,845 | A | 4/1997 | Hickling et al. |
| 5,915,949 | A | 6/1999 | Johnson |
| 6,046,834 | A | 4/2000 | Asada et al. |
| 6,125,446 | A | 9/2000 | Olarig et al. |
| 6,250,255 | B1 | 6/2001 | Lenhardt et al. |
| 6,298,011 | B1 | 10/2001 | Nyberg et al. |
| 6,362,736 | B1 | 3/2002 | Gehlot |
| 6,718,681 | B2 | 4/2004 | Bhullar |
| 6,853,328 | B1 | 2/2005 | Guice et al. |
| 6,914,529 | B2 | 7/2005 | Barber et al. |
| 7,071,829 | B2 | 7/2006 | Gardner, Jr. et al. |
| 7,286,056 | B2 | 10/2007 | Kates |
| 7,373,254 | B2 | 5/2008 | Pierce |
| 7,696,857 | B2 | 4/2010 | Kritt et al. |
| 7,799,146 | B2 | 9/2010 | A Mcloughlin et al. |
| 8,043,511 | B2 * | 10/2011 | Holland .................. C02F 1/487 204/155 |
| 8,164,462 | B1 | 4/2012 | Bose et al. |
| 8,217,772 | B2 | 7/2012 | Morgan et al. |
| 8,400,348 | B1 | 3/2013 | Guice et al. |
| 8,705,017 | B2 | 4/2014 | Hyde et al. |
| 8,810,411 | B2 | 8/2014 | Marka et al. |
| 2002/0144452 | A1 | 10/2002 | Beroza |
| 2003/0101634 | A1 | 6/2003 | Bhullar |
| 2004/0154213 | A1 | 8/2004 | Mosher |
| 2005/0226287 | A1 | 10/2005 | Shah et al. |
| 2006/0215885 | A1 | 9/2006 | Kates |
| 2006/0233049 | A1 | 10/2006 | Callers |
| 2006/0273172 | A1 | 12/2006 | Helez |
| 2008/0257830 | A1 * | 10/2008 | Wu .......................... B01J 19/10 210/748.03 |
| 2009/0190355 | A1 | 7/2009 | DeGinto et al. |
| 2010/0226122 | A1 | 9/2010 | Tsai et al. |
| 2010/0229458 | A1 | 9/2010 | Bowden et al. |
| 2010/0286803 | A1 | 11/2010 | Tillotson et al. |
| 2012/0026732 | A1 | 2/2012 | Fricke |
| 2014/0225003 | A1 | 8/2014 | Koo et al. |

FOREIGN PATENT DOCUMENTS

| | | |
|---|---|---|
| WO | WO 2005/022991 | 3/2005 |
| WO | 2006029249 | 3/2006 |

OTHER PUBLICATIONS

L. Kok, "Mosquitoes Vanish With Zapping Wand", "The Straits Times", Sep. 18, 2010, pp. D9, Publisher: Singapore Press Holdings Ltd., Published in: http://web.mit.edu/hovergroup/pub/Mosquitoes%20vanish%20with%20zapping%20wand.pdf.

S.Z. Child, et al., "The sensitivity of Drosophila larvae to continuous-wave ultrasound," Ultrasound in Medicine & Biology, vol. 18, Issue 8, pp. 725-728, 1992. http://www.umbjournal.org/article/0301-5629%2892%2990123-R/abstract.

S.Z. Child and E.L. Carstensen, "Effects of ultrasound on Drosophila—IV. Pulsed exposures of eggs," Ultrasound in Medicine & Biology, vol. 8, Issue 3, pp. 311-312, 1982. http://www.umbjournal.org/article/0301-5629%2882%2990037-0/abstract.

Sally Z. Child, et al., "Effects of ultrasound on drosophila: III. Exposure of larvae to low-temporal-average-intensity, pulsed irradation," Ultrasound in Medicine & Biology, vol. 7, Issue 2, pp. 167-173, 1981. http://www.umbjournal.org/article/0301-5629%2881%2990006-5/abstract.

S.B. Barnett, et al., "Review: Current status of research on biophysical effects of ultrasound," Ultrasound in Medicine & Biology, vol. 20, Issue 3, pp. 205-218, 1994. http://www.umbjournal.org/article/0301-5629%2894%2990060-4/abstract.

Wesley L. Nyborg, "Biological effects of ultrasound: Development of safety guidelines. Part II: General review," Ultrasound in Medicine & Biology, vol. 27, Issue 3, pp. 301-333, Mar. 2001. http://www.umbjournal.org/article/S0301-5629%2800%2900333-1/abstract.

Vu Sinh Nam, et al., "Eradication of Aedes Aegypti from a Village in Vietnam, Using Copepods and Community Participation," Am. J. Trop. Med. Hyg., 59(4), pp. 657-660, 1998. http://www.ajtmh.org/content/59/4/657.full.pdf+html.

Bertoldo, S., et al., "A Wireless Sensor Network Ad-Hoc Designed as Anti-Theft Alarm System for Photovoltaic Panels," Wireless Sensor Network, Apr. 2012, pp. 107-112, vol. 4, No. 4.

Chen, Y., et al., "Flying Insect Detection and Classification with Inexpensive Sensors," Journal of Visualized Experiments, Oct. 2014, Issue 92.

Enayati, A., et al., "Electronic mosquito repellents for preventing mosquito bites and malaria infection (Review)," Cochrane Database of Systemic Reviews, 2007, pp. 1-19, Issue 2.

Fradin, M., "Mosquitoes and Mosquito Repellents: A Clinician's Guide," Ann Intern Med., 1998, pp. 931-940, vol. 128, Issue 11.

Guo, H., et al., "An Automotive Security System for Anti-theft," Eighth International Conference on Networks, Mar. 2009, pp. 421-426.

International Search Report and Written Opinion for PCT Application No. PCT/US2017/012128, dated Mar. 30, 2017, pp. 1-7.

International Search Report and Written Opinion for PCT Application No. PCT/US2017/012137, dated Mar. 17, 2017, pp. 1-14.

Lemaire, X., "Off-grid electrification with solar home systems: The experience of fee-for-service concession in South Africa," Energy for Sustainable Development, Sep. 2011, pp. 277-283, vol. 15, No. 3.

McGraw, E.A., et al., "Beyond insecticides: new thinking on an ancient problem," Nature Reviews Microbiology, Mar. 2013, pp. 181-193, vol. 11.

Raman, D.R., "Detecting insect flight sounds in the field: implications for acoustical counting of mosquitoes," Transactions of the ASABE, 2007, pp. 1481-1485, vol. 50, Issue 4.

Reynolds, D.R., et al., "Remote-sensing, telemetric and computer-based technologies for investigating insect movement: a survey of existing and potential techniques," Computers and Electronics in Agriculture, 2002, pp. 271-307, vol. 35.

Sperling, G., et al., "Three theories of stroboscopic motion detection," Spatial Vision, 1985, pp. 47-56, vol. 1, Issue 1.

Visconti, P., et al., "Intelligent system for monitoring and control of photovoltaic plants and for optimization of solar energy production," IEEE 15th International Conference on Environment and Electrical Engineering, Jun. 2015, pp. 1-6.

Zittrain, J., "The Case for Kill Switches in Military Weaponry," Scientific American, Sep. 2014, pp. 1-5.

International Search Report and Written Opinion for PCT Application No. PCT/US2010/031437, dated Jun. 15, 2010, pp. pp 1-9.

* cited by examiner

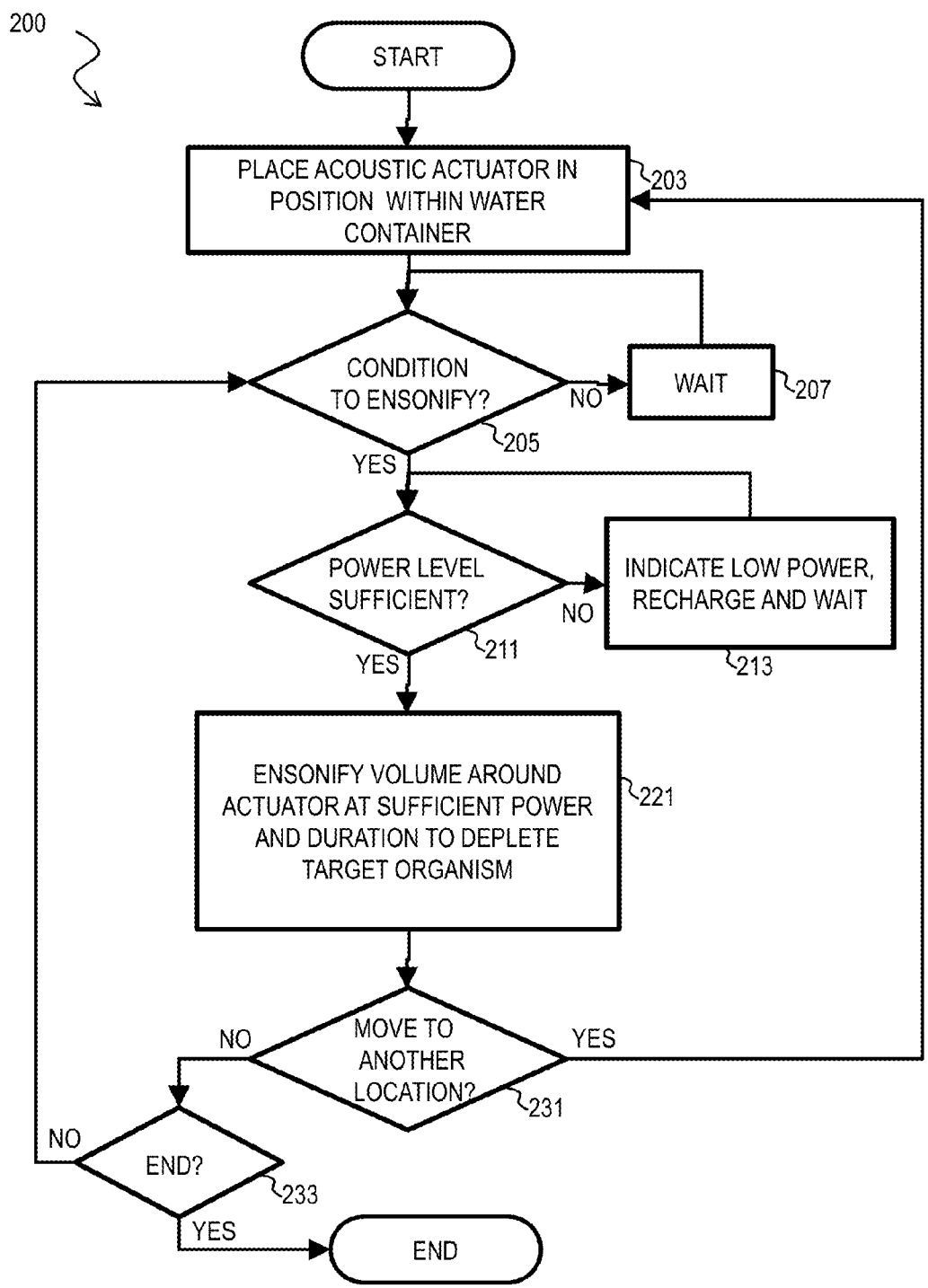

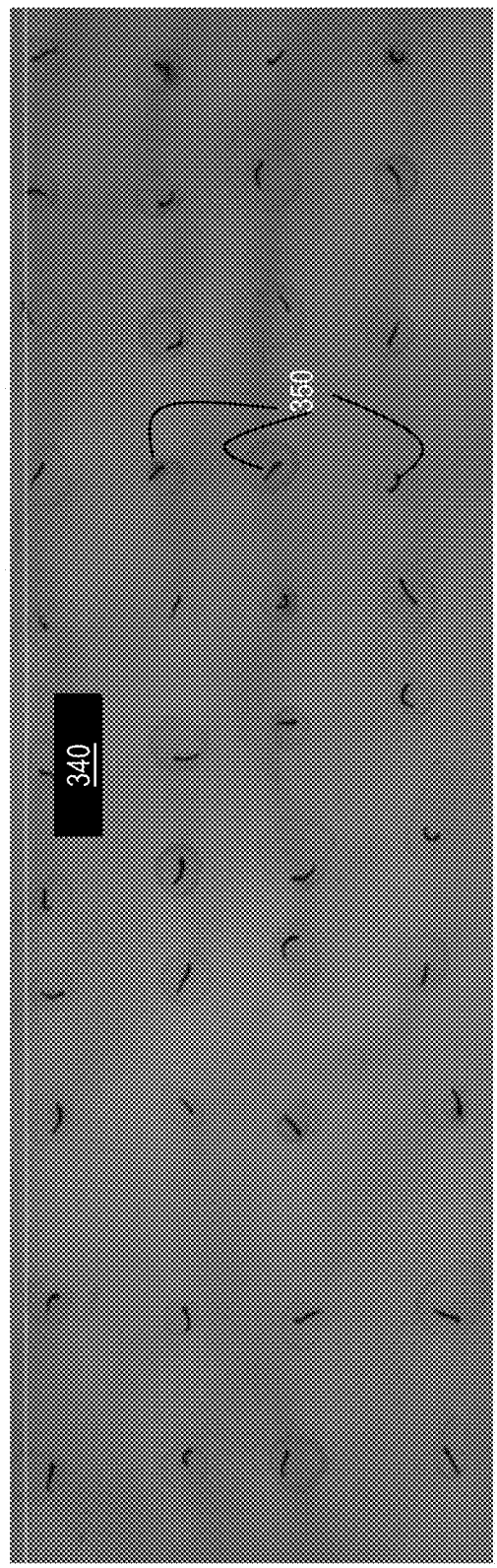

LARVAE THAT APPEAR ALIVE
730

720  710

US 9,944,541 B2

SYSTEM FOR CLEANSING ORGANISMS FROM WATER

CROSS-REFERENCE TO RELATED APPLICATIONS

This application claims benefit of Provisional Appln. 61/923,745, filed Jan. 5, 2014, the entire contents of which are hereby incorporated by reference as if fully set forth herein, under 35 U.S.C. § 119(e).

This application also claims benefit as a Continuation-in-part of Patent Cooperation Treaty Appln. Ser. No. PCT/US2012/056,515, filed Sep. 21, 2012 the entire contents of which are hereby incorporated by reference as if fully set forth herein, under 35 U.S.C. § 120, which claims benefit of Provisional Appln. 61/537,569, filed Sep. 21, 2011, the entire contents of which are hereby incorporated by reference as if fully set forth herein, under 35 U.S.C. § 119(e).

BACKGROUND OF THE INVENTION

Antropophilic mosquitoes—such as *Aedes aegypti*, the principal vector of dengue viruses, among others—use man-made water containers around households as breeding sites [6]. These still water containers provide ideal locations for the mosquito larvae, and their location in the vicinity of humans greatly helps the newly hatched mosquitoes to quickly find hosts and spread vector-borne diseases, such as dengue or malaria, in an explosive manner. The regular treatment or cleaning of such containers is laborious [6], may involve toxic chemicals, and is often omitted especially if the water is intended for drinking. Potentially, hundreds of thousands, even millions of containers should be kept clean continuously to eradicate such disease.

SUMMARY OF THE INVENTION

Techniques are provided for depleting target organisms in a container of water by ensonifying the container of water with low intensity sound at one or more ultrasound frequencies for a duration sufficient to deplete at least 90% of the target organism.

In a first set of embodiments, a system for depleting target organisms in water comprising a control system and a waterproof transducer configured for ensonifying a container of water with low intensity sound at one or more ultrasound frequencies for a duration sufficient to prevent maturation of at least 90% of the target organism.

In a second set of embodiments, a portable system for depleting target organisms in water includes a control system and a plurality of waterproof transducers. The system is configured for ensonifying a surface layer of water in an acoustic frequency range from about 40 kilohertz to about 100 kilohertz and in a power concentration range from about 35 milliwatts per milliliter to 100 milliwatts per milliliter for a duration in a range from about 1 to about 100 seconds. In some of these embodiments, the control system causes the waterproof transducers to ensonify the surface layer during a plurality of ten second pulses. In some embodiments of the first set, the waterproof transducers are configured for ensonifying the surface layer at a first acoustic frequency of about 40 kilohertz and a second acoustic frequency of about 68 kilohertz.

In a third set of embodiments, a method for depleting target organisms in a container of water comprising ensonifying the container of water with low intensity sound at one or more ultrasound frequencies for a duration sufficient to deplete at least 90% of the target organism.

In a fourth set of embodiments, a non-transient computer-readable medium carrying one or more sequences of instructions, wherein execution of the one or more sequences of instructions by one or more processors causes an apparatus to ensonify a container of water with low intensity sound at one or more ultrasound frequencies for a duration sufficient to deplete at least 90% of a target organism.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates a method for depleting a target organism in one or more containers of water, according to an embodiment;

FIG. 3C is a photograph that illustrates example *Anopheles gambiae* larvae destroyed by HFA exposure; collected and ready for counting/archival, according to an embodiment;

DETAILED DESCRIPTION

Figure 1:
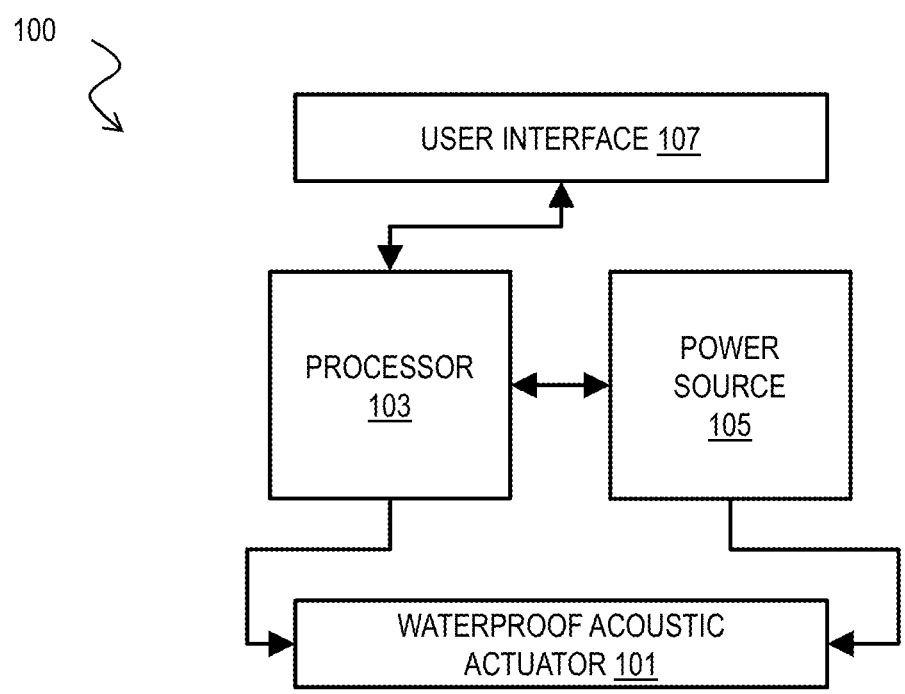
FIG. 1 is a block diagram that illustrates an apparatus for ensonifying a container of water, according to an embodiment.

A method and apparatus are described for depleting target organisms in a container of water by ensonifying the container of water with ultrasound. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of mosquito larvae as the target organism. However, the invention is not limited to this context. In other embodiments other water-borne organisms, alone or in combination, are the target organism. For example, various species of disease vectors and infectious agents, including *Aedes aegypti, Aedes albopictus, Aedes polynesiensis, Aedes cinereus, Aedes vexans, Anopheles gambiae, Anopheles punctipennis, Anopheles quadrimaculatus, Anopheles stephensi, Anopheles walker, Coquillettidia perturbans, Culex erraticus, Culex pipiens, Culex restuans, Culex tarsalis, Culex territans, Culiseta inornata, Haemagogus mosquitoes, Ochlerotatus canadensis, Ochlerotatus dorsalis, Ochlerotatus fitchii, Ochlerotatus sollicitans, Ochlerotatus triseriatus, Ochlerotatus trivittatus, Orthopodomyia signifera, Psorophora ciliata, Psorophora cyanescens, Toxorhynchites, Culiseta alaskaensis,* and *Simulium damnosum,* live at least parts of their life cycles (e.g., as larvae) in water and are therefore prime targets for ultrasonic treatments as described herein.

As used herein, a container is any limited size natural or manmade depression or vessel in which water collects and stands, including puddles, animal footprints, pots, barrels and drums. Ultrasound and high frequency acoustics (HFA) each refer to pressure waves in gas, fluid or solid at frequencies above about 15,000 hertz (1 hertz=1 cycle per second; 1 kilohertz, kHz, $=10^3$ Hertz).

The life cycles of some pests, such as mosquitoes or some amoebae, are closely connected to natural or artificial containers of still water, such as household water vessels and tanks, or puddles. Such containers are important targets for eradication efforts. There is a growing interest in going beyond chemicals, biological agents, and toxins and stepping into the high-tech field for pest control.

It has been shown that acoustic vibrations above the kiloHertz frequencies can destroy organisms, therefore cleanse water and potentially mitigate disease transmission. Thus ultrasound is an efficient, low-cost, environmentally friendly mechanism that can be lethal to various organisms in water [1-5].

1. OVERVIEW

A set of viable ultrasonic devices are described to efficiently rid from such water containers organisms such as mosquito larvae, amoebae or other animals or plants using accessible and robust acoustic technology, modified, in some embodiments, for this purpose.

FIG. 1 is a block diagram that illustrates an apparatus 100 for ensonifying a container of water, according to an embodiment. The apparatus 100 includes a waterproof acoustic actuator 101 (also called a sonicator herein) capable of transferring HFA energy into water. The apparatus also includes a power source 105 to drive the actuator sufficiently to transfer enough energy to deplete a population of target organisms, such as mosquito larvae. In some embodiments, the power source includes a chemical battery, a fuel cell, a gravity drive, or a solar panel or some other source of renewable energy. In the illustrated embodiment, the actuator 101 and power source 105 are monitored or controlled or both by a processor 103, such as a digital microprocessor or analog electronic circuit. In some embodiments, the processor is controlled by a user interface 107, such as an analog button or trigger or a digital interface, such as a graphical user interface on a touch screen, or a remote controller and a radio receiver.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

FIG. 2 is a flow diagram that illustrates a method 200 for depleting a target organism in one or more containers of water, according to an embodiment. Although steps are depicted in FIG. 2 as integral blocks in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In step 203 the ultrasound actuator is placed in position within a container of water. For example, actuator 101 of apparatus 100 is placed at a first depth in a water storage barrel.

In step 205, it is determined whether a condition predicate is satisfied to ensonify the container. For example, in some embodiments, it is determined that the user has pressed a button or trigger or other active area of the user interface 107. In other embodiments, it is determined in processor 103 that sufficient time has elapsed since the last ensonification that the target organism population has recovered enough to again be subjected to depletion for any programmed reason. For example, several days after a container is ensonified to deplete mosquito larvae, it is time to ensonify the container again. In other embodiments, the condition predicate for ensonification is triggered by other conditions, such as reaching sufficient stored power level; a sensor measuring some environmental property achieves a threshold signal level; a wireless transmission is received; the sonicator becomes immersed; or some combination.

If it is determined in step 205 that a condition predicate to ensonify is not satisfied, then in step 207 a wait ensues until a later time. For example, the processor counts multiple clock cycles in some embodiments. In some embodiments, a human operator ceases to operate the apparatus for a while. Control then passes back to step 205.

If it is determined in step 205 that it a condition predicate to ensonify is satisfied, then control passes to step 211. In step 211, it is determined whether there is sufficient power to ensonify the container in order to deplete the population of the target organism. For example, in some embodiments, it is determined that the battery level is sufficient, or that a solar panel has accumulated sufficient charge on a charge storage capacitor to drive the actuator at designed power levels.

If it is determined in step 211 that there is not sufficient power, then in step 213 a power recovery process is executed. For example, an indication of low power is presented at the user interface 107, and a wait ensues until the power is recharged, e.g., by allowing the solar panel to further accumulate charge on the capacitor or to replace or recharge a battery. Control then passes back to step 211.

If it is determined in step 211 that the power level is sufficient, then control passes to step 221. In step 221, a volume of water around the actuator is ensonified at sufficient power and duration to deplete the population of the target organism. For example, a volume is ensonified with 35 Watts at 42,000 Hz for ten seconds to deplete 94% of the mosquito larvae, as demonstrated in the experimental embodiment described below.

In step 231, it is determined if the actuator should be moved to another location, e.g., to another depth or position in the container, or to another natural or man-made container. If so, control passes back to step 203 to position the actuator again. If not, control passes to step 233.

In step 233, it is determined whether the process at the current location is complete. For example, it is determined whether the container is empty of water or the device 100 is due to be taken out of service. If so, then the process ends. If not, then control passes back to step 205 to determine whether it is time to ensonify again, and following steps, as described above.

2. EXAMPLE EMBODIMENTS 2.1 Fixed Container

According to an experimental embodiment in a fixed container, 35 Watts per liter is more than sufficient power to deplete mosquito larvae population by 94% in ten seconds.

*Anopheles gambiae* larvae of varying ages were used to study the biological effect of relatively low intensity (<<35 W/l) ultrasonic vibrations (about 42 kHz) at very short exposure times, between 1 second and 60 seconds. The observed mortality rate of larvae was stunning:

1 second of ultrasonic exposure produced ~70% immediate mortality;
5 seconds of ultrasonic exposure produced ~84% immediate mortality;
10 seconds of ultrasonic exposure produced 94% immediate mortality;
60 seconds of ultrasonic exposure produced 94% immediate mortality.

A control group received the same treatment except that the acoustic actuator was not turned on. This group survived the experiment. However, even a small duration of ultrasound was enough to kill the larvae with high efficiency. These results indicate that even lower power ultrasound can be effective, and durations on the order of seconds are sufficient to eradicate the pests. Higher mortality rates are expected at all duration with the use of multiple ultrasonic frequencies to attack a wider range of larval sizes and address container geometries, standing waves, shadows, and fleeing larvae.

Figure 3A:
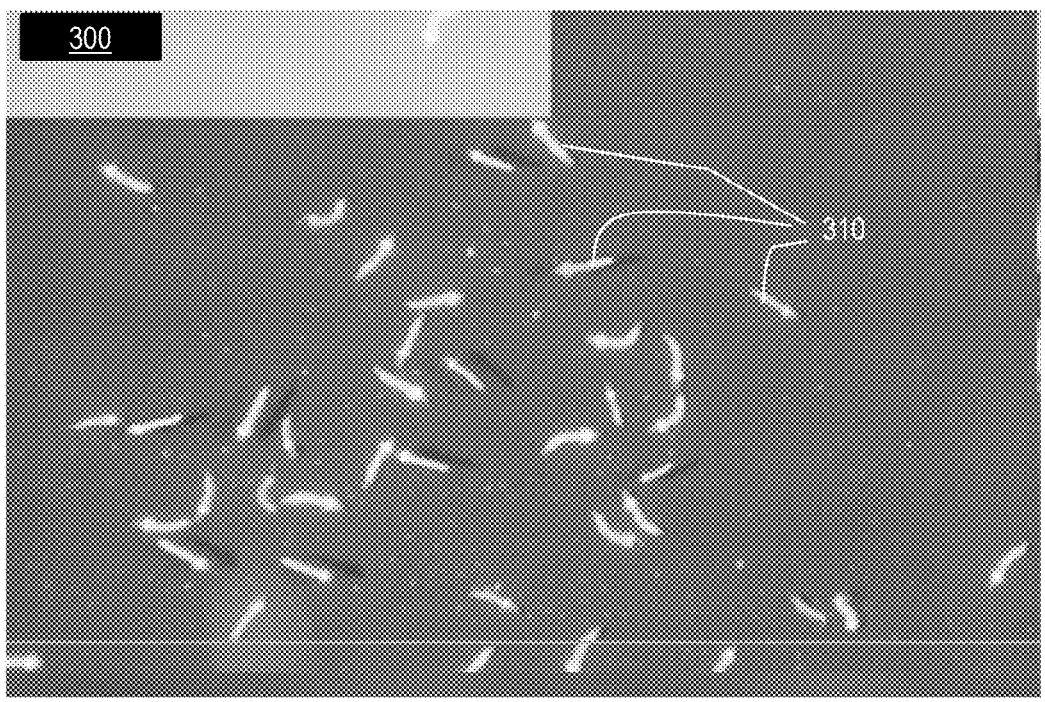
FIG. 3A is a photograph that illustrates example *Anopheles gambiae* larvae before high frequency acoustic (HFA) exposure, according to an embodiment.
Figure 3B:
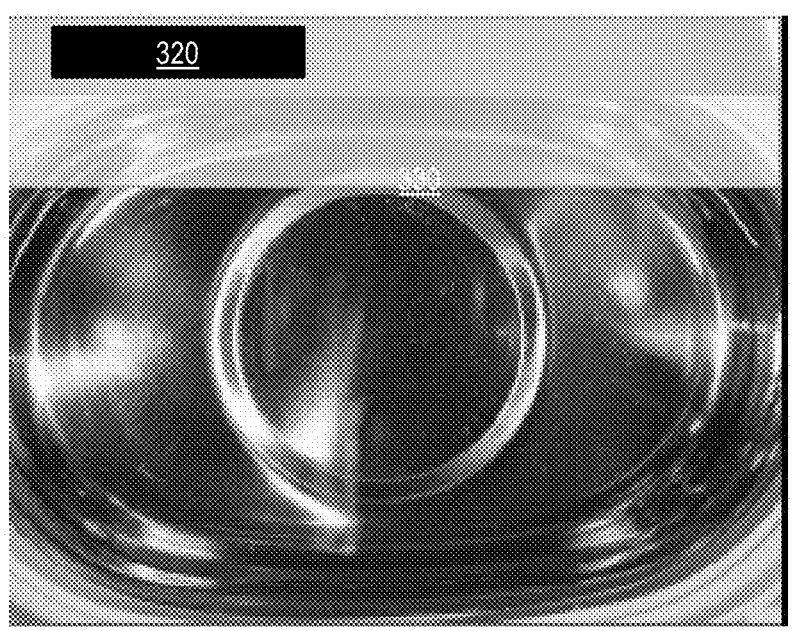
FIG. 3B is a photograph that illustrates an example acoustic actuator inside of a low cost ultrasound cleaner before use, according to an embodiment.

FIG. 3A is a photograph 300 that illustrates example *Anopheles gambiae* larvae 310 before high frequency acoustic (HFA) exposure, according to an embodiment. FIG. 3B is a photograph 320 that illustrates an example acoustic actuator 330 inside of a low cost ultrasound cleaner before use, according to an embodiment. FIG. 3C is a photograph 340 that illustrates example *Anopheles gambiae* larvae 350 destroyed by HFA exposure; collected and ready for counting/archival, according to an embodiment.

Figure 7A:
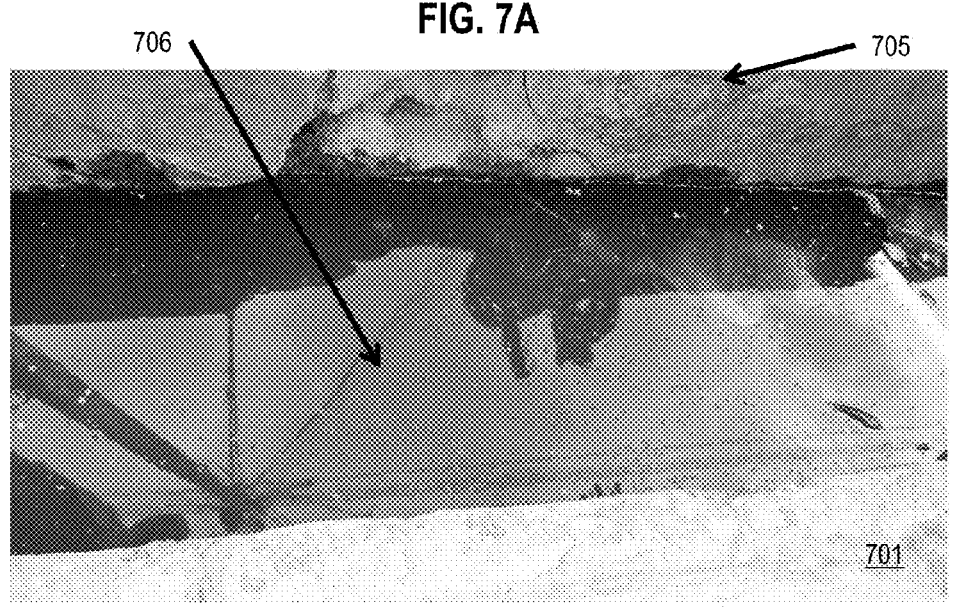
FIG. 7A, FIG. 7B and FIG. 7C are photographs that illustrate example larvae-infested standing water from a ditch in an African country.
Figure 7B:
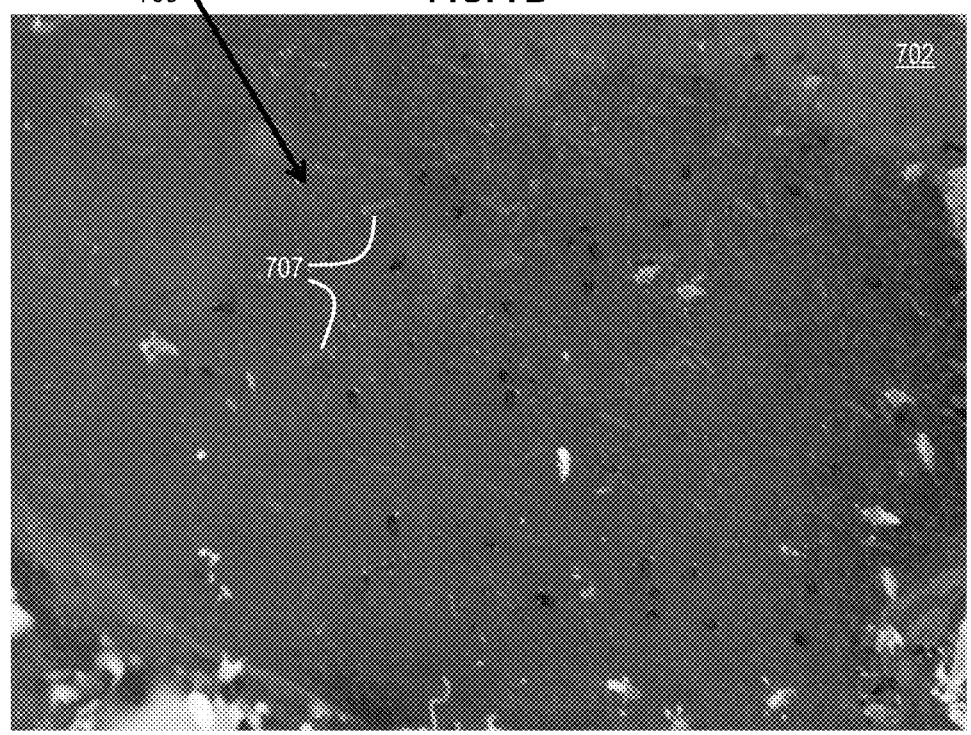
Figure 7C:
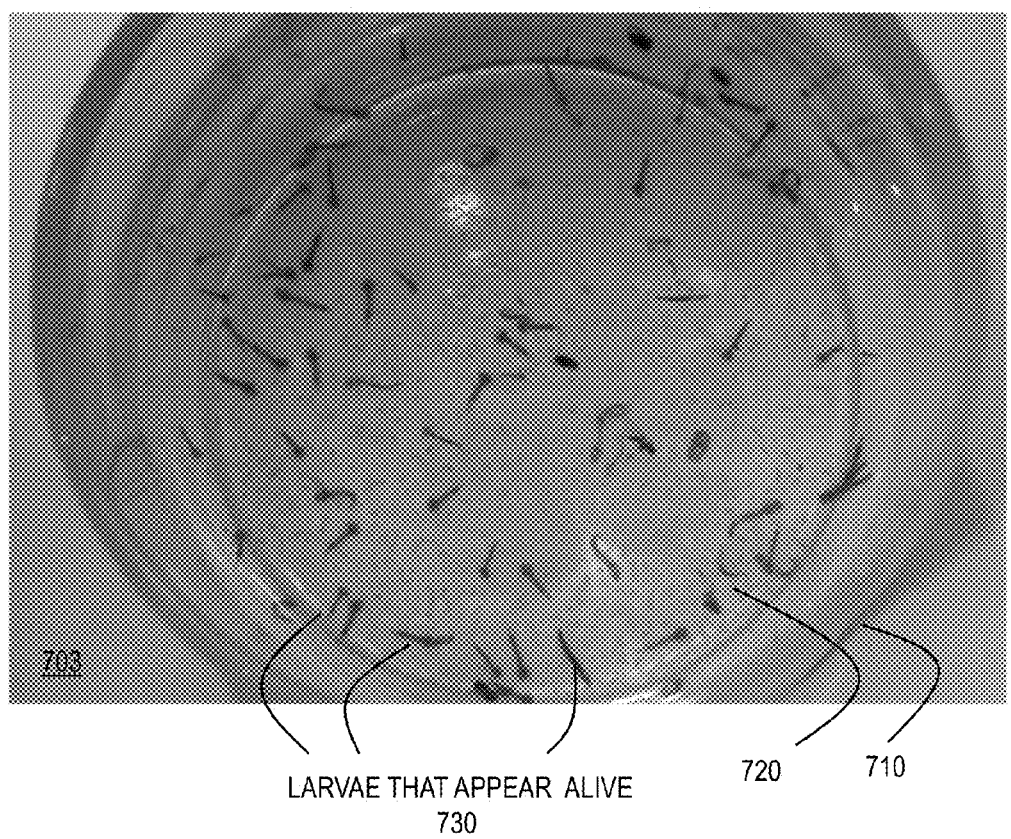

In another experimental embodiment, a small ultrasonic device is used to deplete organisms in a water sample retrieved from a targeted geographic locale. FIG. 7A, FIG. 7B and FIG. 7C are photographs that illustrate example larvae-infested standing water from a ditch in an African country used in an experiment, according to an embodiment. FIG. 7A is a photograph 701 that illustrates an example urban drainage ditch 705 that provided a water sample. The ditch 705 contains standing water 706. A water sample was selected at a random from this stagnant urban drainage ditch in Africa. There were larvae of multiple insect species in the water beyond the larvae of (unidentified) mosquitoes of varying ages. FIG. 7B is a photograph 702 that illustrates an example close-up of standing water 706. Evident are multiple larvae 707. FIG. 7C is a photograph 703 that illustrates an example close-up of a dish 710 that contains a water sample 720 from the standing water 706. Evident are multiple larvae 730 that all appear alive because they become active when the dish 710 is shaken manually.

Figure 8A:
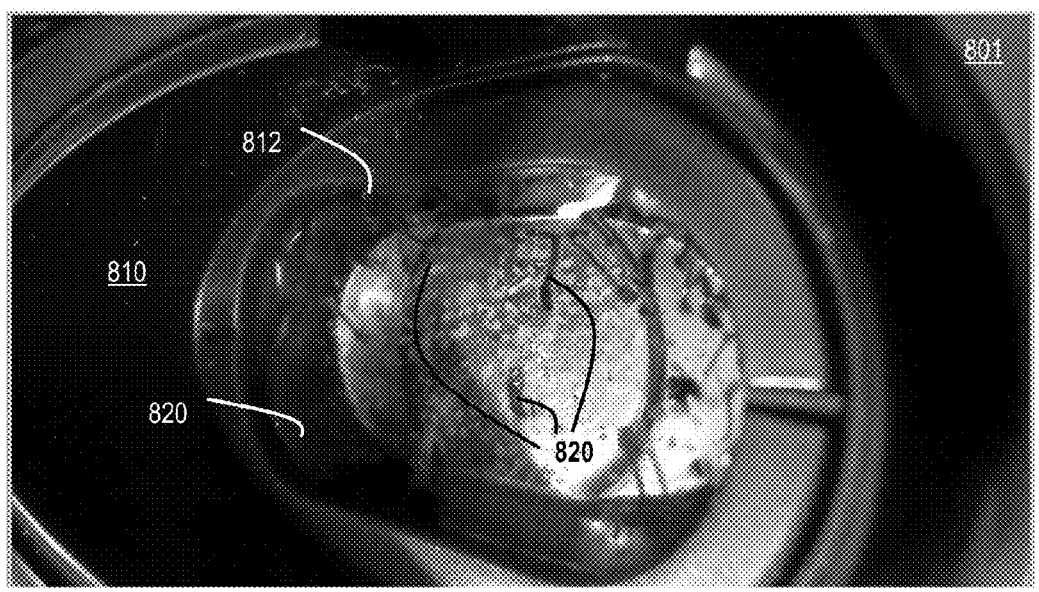
FIG. 8A is a photograph that illustrates an example experimental apparatus with a subsample of water from the dish depicted in FIG. 7C before ensonification, according to an embodiment.
Figure 8B:
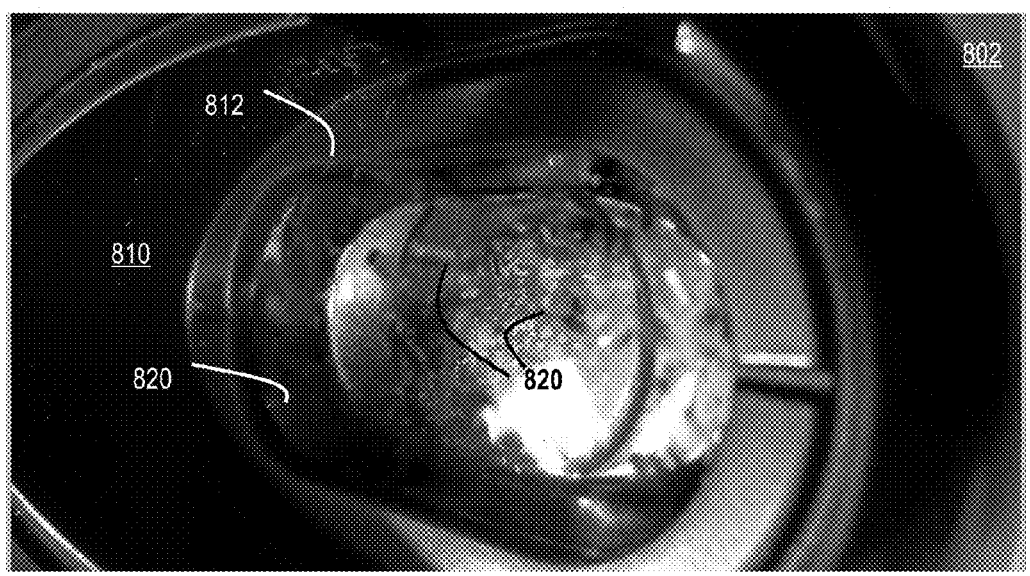
FIG. 8B is a photograph that illustrates an example experimental apparatus with a subsample of water from the dish depicted in FIG. 7C at onset of ensonification, according to an embodiment.

FIG. 8A is a photograph 801 that illustrates an example experimental apparatus 810 with a subsample 820 of water from the dish 710 depicted in FIG. 7C before ensonification, according to an embodiment. The example experimental apparatus 810 used was a Codyson Ultrasonic Contact Lens Cleaner manufactured commercially by SHENZHEN CODYSON ELECTRICAL CO., LTD.™ of Guangdong, China. It is a simple low power sonicator that was connected to a wall power outlet via a plug-in power converter. This apparatus 810 ensonifies a volume in fluid container 812 of about 10 cubic centimeters (equal to 10 milliliters). The ensonification is delivered at 120 kHz consuming power of about 7 watts and delivering a small fraction of that as sound wave power on each duty cycle of multiple duty cycles. This amounts to a power level of much less than 0.7 watts per milliliter, or 700 milliwatts per milliliter. A subsample 820 of water from dish 710 with larvae 820 was placed into the fluid container 812. Photograph 801 was taken Sunday, Jan. 8, 2012, 8:50:37 AM Eastern Standard Time. FIG. 8B is a photograph that illustrates the example experimental apparatus 810 with a subsample 820 of water from the dish 710 depicted in FIG. 7C during ensonification, according to an embodiment. The larvae 820 are disturbed by the ensonification, resulting in violent gyrations that cause the larvae to appear blurred in the photograph 802. Photograph 802 was taken at start of ensonification on Sunday, Jan. 8, 2012, 8:50:40 AM Eastern Standard Time.

Figure 9:
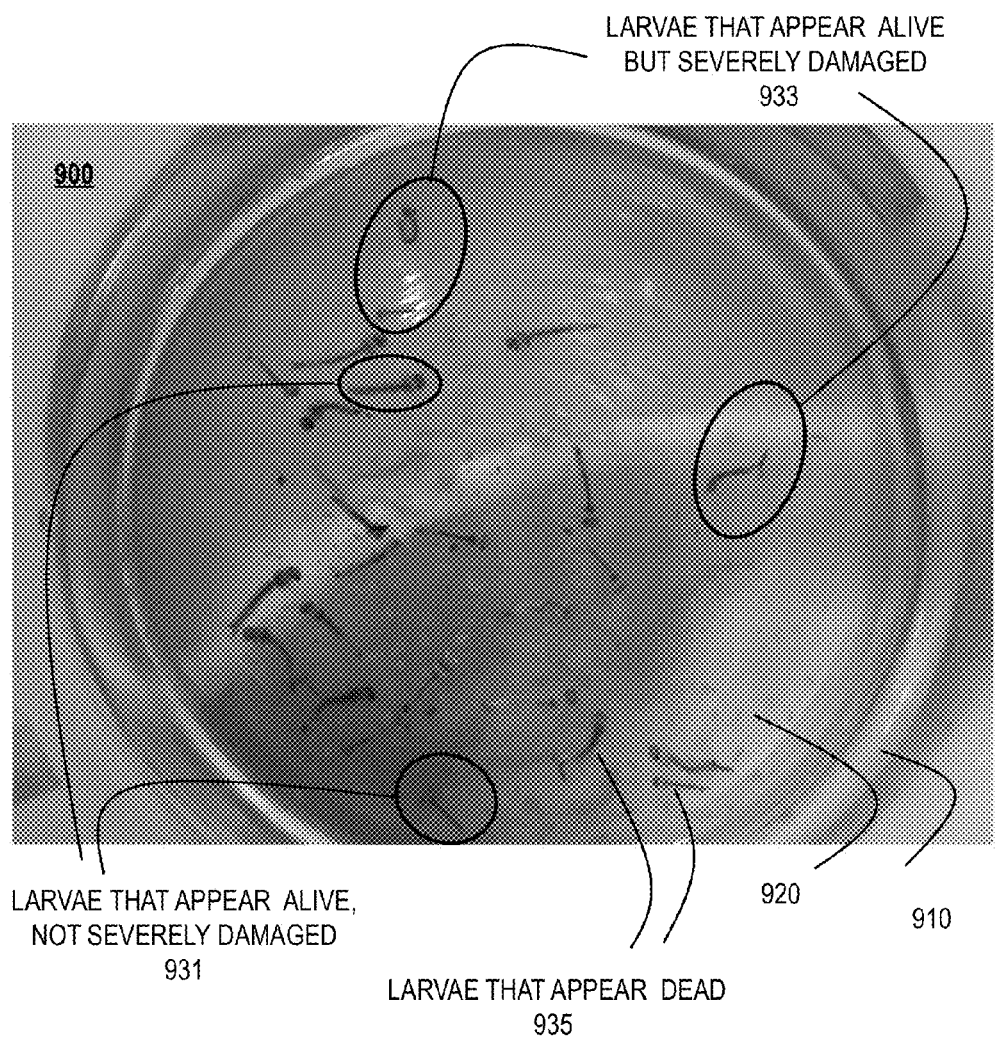
FIG. 9 is a photograph that illustrates an example result after prolonged ensonification depicted in FIG. 8B, according to an embodiment.

FIG. 9 is a photograph 900 that illustrates an example result after completion of the ensonification depicted in FIG. 8B, according to an embodiment. A sample dish 910 holds a water sample 920 discharged from the experimental apparatus 810 of FIG. 8B, after a sequence of 120 kH sonic exposures, using a duty cycle of about 50% on and about 50% off, and lasting for a total time on of less than 100 seconds. Photograph 900 was taken on Sunday, Jan. 8, 2012, 10:41:28 PM Eastern Standard Time, several hours after treatment ended. The water sample 920 includes about thirty larvae. The states of the larvae were estimated by determining which became active in response to manually shaking the dish 910. About five larvae appear alive. Two larvae 931 appear alive without severe visible bodily damage; and, three larvae 933 appear alive but show severe bodily damage. The remaining larvae 935 appear dead. Assuming a total of 26 larvae in the water sample, this amounts to about 80% killed and 12% severely damaged, for a total of 92% depleted and about 8% survival. Even without any attempts at optimization, a depletion rate over 90% is achieved.

In a different experiment, the effect of 42 kHz frequency ultrasound (single 20 second long duration pulse in approximately 100 $cm^2$ size tray) on larvae of various ages (thus sizes) was studied. For small larvae (3 days old) the kill rate was 53%, for 6-8 days old the kill rate was 85%, for 9 days old the kill rate was 93%, for 10-11 days old the kill rate was 100%. Dead larvae were counted the day after applying ultrasound treatment. The surviving larvae were kept fed and monitored to see whether they reach the pupa stage. For larvae treated on their 3rd day with ultrasound, 10% of them made it to the pupa phase. For 6 days old larvae treated with ultrasound, 5% of them made it to the pupa phase. Older larvae which survived at least an additional day died later, never reaching the pupa phase. Overall, the treatment ensured that for small larvae (3 days old) less than 4.7% of the larvae reached adulthood, for 6-8 days old less than 0.75% of the larvae reached adulthood, for 9-11 days old none of the larvae reached adulthood.

2.2 Sonicator in Barrel

Due to reflections from container boundaries, a significant part of the power remains in the water within the container, in some embodiments. It is observed that, for cleaning purposes, the sonicator is just hung at a barrel wall and it covers the full volume of the barrel. It is expected that reduced intensity, improved geometry and varying/multiple frequencies can produce even better results. A small well-made commercial acoustic actuator that is part of an ultrasound cleaner from Chicago Electric Power Tools was used effectively in this experiment. The retail cost of the device is on the order of $30, thus making the actuator affordable in large numbers to protect a wide area, with additional savings possible from mass production economies of scale.

The short exposure duration and low power consumption already indicates that low cost devices that harvest renewable power (e.g., solar cells) for days and expend their power a few times a week during ensonification events are viable and effective.

In some embodiments, an ultrasonic device is permanently placed in water containers and automatically activates on a periodic basis to kill mosquito larvae and potentially other troublesome biological agents in the container. If used against mosquitoes, it is sufficient if the device needs to activate a few times during the mosquito's larva cycle (e.g., a few times a week). The device can be charged by locally available cheap renewable sources, e.g. a small connected solar panel, that provide sufficient charging capacity that enough power is saved for the short duration of activation (order of seconds) after a long collection time frame (order of days). Naturally, pools, fountains, and other common still bodies of water in the United States and worldwide can also be equipped by (more sophisticated) versions of these devices to keep our neighborhoods mosquito free and, simultaneously, chemical/poison free.

Figure 4:
FIG. 4 is a diagram that illustrates an example apparatus collecting renewable energy for days for use in an HFA burst lasting for seconds or longer, according to an embodiment.

FIG. 4 is a diagram 400 that illustrates an example apparatus collecting renewable energy for intervals of minutes to days for use in an HFA burst lasting for seconds or minutes, according to an embodiment. It can be quite efficient and affordable. Solar panel cells 405a, 405b mounted outside each of two water containers 410a, 410b, respectively, collect solar energy for powering an ultrasound acoustic actuator, such as actuator 401 in container 410a.

2.3 Walking Stick Embodiments

In some embodiments, a handheld ultrasonic device (e.g., disposed in a walking cane shaped body) is transported between locations of water containers or puddles and is used for a short period of time (order of seconds to minutes) at each container to clean it from the undesirable organisms, e.g. mosquito larvae. The device can be used in regions where a person can supervise an area by commuting or walking to the sites of small water containers (puddles, water tanks, etc) and clean them one-by-one using the same device. Since it is sufficient to touch and treat each body of water only a few times a week, this can be a cost effective solution at places where human effort is more affordable than solar panel technology or high human traffic provides targets of opportunity at little incremental cost. In some embodiments, a related device [7] may be modified for such a use.

Figure 5A:
FIG. 5A and FIG. 5B are diagrams that illustrate an example handheld apparatus (rechargeable through renewable or traditional means) transported between locations and used for a short period of time on natural stands of water, according to an embodiment.
Figure 5B:
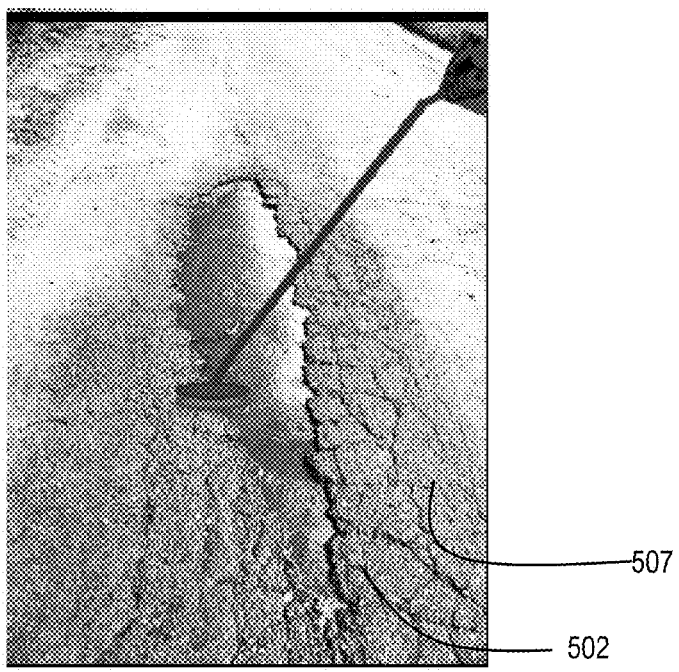
Figure 6:
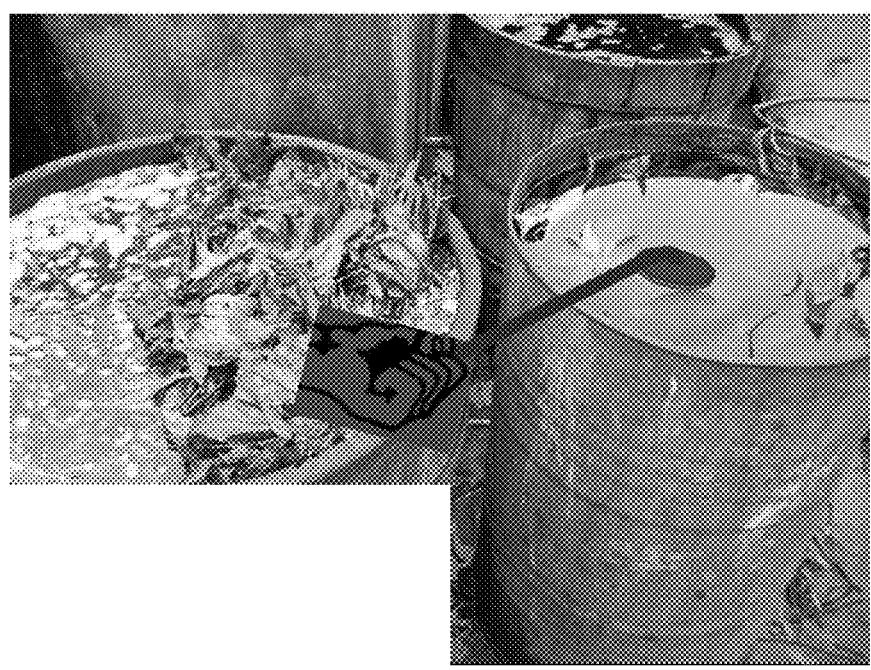
FIG. 6 is a diagram that illustrates an example handheld apparatus transported between locations and used for a short period of time on man-made stands of water, according to an embodiment.

FIG. 5A and FIG. 5B are diagrams 500, 520, respectively, that illustrate an example handheld apparatus 502 with actuator 501 at one end and user interface 507 at the user's hand on the other end. This device 502 is transported between locations and used for a short period of time on natural stands of water, according to an embodiment. FIG. 6 is a diagram that illustrates an example handheld apparatus transported between locations, which is used for a short period of time on man-made stands of water, according to an embodiment. Because it is sufficient to touch each body of water only a few times a week for a few seconds or minutes each time, this device can offer a cost-effective solution at places where human effort is more affordable than solar panel technology or where high human traffic provides ample targets of opportunity.

Example problems in global health that can be solved or mitigated through such ultrasound devices and methods include *Aedes aegypti*, an anthropophilic mosquito that is the principal vector of dengue viruses. Potentially, hundreds of thousands or millions of containers should be kept clean continuously to eradicate the disease.

2.4 Pulsing Embodiments

The example embodiments demonstrate that effective cleansing of standing water occurs by ensonifying the standing water in an acoustic frequency range from about 30 kHz to about 120 kHz in a power concentration range from about 35 to 700 milliwatts per milliliter (mW/ml) for a duration in a range from about 1 to about 100 seconds. In some embodiments, relative power pulsing and time structure are chosen to achieve desired efficiency for one or more species. For example, to enhance efficacy against one or more target species of larvae, rather than emitting long duration pulses at one power level, low power is emitted in pulses or continuously to make the target species move continuously, then an occasional very short higher power blast at random times is emitted. The high blast is effective at killing in constructive interference nodes of the vibration pattern; and, the low power at the same or different frequency is used to excite the larvae to move out of a null point in the vibration pattern.

In some embodiments, a preferred acoustic frequency range is from about 40 kilohertz to about 100 kilohertz. In some embodiments, a preferred power concentration range is from about 35 milliwatts per milliliter to 100 milliwatts per milliliter. In some embodiments, a preferred duration range is from about 1 to about 100 seconds. In some embodiments, a combination of two or more of the above ranges is used.

In general, pulsed-dual frequency operation mode is more effective than single frequency or continuous operating mode. This is likely due to more chaotic, more penetrating wave propagation feature in the applied volume, i.e. the lower probability of establishing quiet hidden, shadowed, or standing wave regions.

Experiments with different frequencies at significantly less power were performed, indicating that the eradication efficiency increases with larvae age/size, reaching 100% even at low power levels, and that the ultrasonic treatment significantly decreases the chance to become adults later on for even larvae that survive the initial treatment.

2.5 Example Components

In various embodiments, the waterproof acoustic actuator 101 is configured to emit one or more ultrasonic frequencies in a range from about 30 kHz to about 1000 kHz. In another set of embodiments, the waterproof acoustic actuator 101 is configured to emit multiple frequencies in a range from about 40 kHz to about 120 kHz. In another set of embodiments, the waterproof acoustic actuator 101 is configured to emit multiple frequencies in a range from about 40 kHz to about 100 kHz. Example acoustic actuators include TX517 from TEXAS INSTRUMENTS™ of Dallas, Tex., which is a fully integrated, dual channel, high-voltage Transmitter with control logic. Submersible ultrasonic transmitters include CLANGSONIC™ CN120-1800, a 40/120 kHz 1800 Watts submersible transducer, CLANGSONIC™ CN28-2000, a 28 kHz 2000 Watts submersible transducer, and CLANGSONIC™ CN120-1600, a 120 kHz 1600 Watts submersible transducer, all available from YUHUAN CLANGSONIC ULTRASONIC TRANSDUCER CO., LTD™ of Zhejiang, China. Other candidate ultrasonic transducers include the JTM-1040 Industrial Ultrasonic Cleaner 28 kHz and 40 kHz at 2000 Watts, available from SKYMEN CLEANING EQUIPMENT SHENZHEN CO., LTD.™ of Guangdong, China; and COSSON™ KS-A1440H09TR-W1 40 kHz from DONGGUAN COSSON ELECTRONIC PLASTIC CO., LTD.™ of Guangdong, China.

In various embodiments, the power source 105 is a battery pack, a fuel cell or a solar power cell, such as a photovoltaic cell, a capacitor, or any other suitable renewable or traditional power source, such as shaking from traffic or animal movement or wind or water wheel, which is adequate at these power levels, alone or in some combination. Several commercial solar cells are available from FUTURLEC™ of New York City, N.Y., such as 0.5 volt (V), 280 milliAmpere (mA, 1 mA=$10^{-3}$ Amperes) High Efficiency Miniature Solar Cell, Part Code: SZGD6030, available at time of this writing for about 1.5 US dollars, which offers high-current output, ideal for use in low-voltage applications and battery chargers. In some embodiments, this solar cell is combined in series or parallel arrangements for increased voltage or current. Also available from FUTURLEC™ is a 6.0 V 16 mA High Voltage Miniature Solar Cell, Part Code: SZGD5020, also available at time of this writing for about 1.5 US dollars, which is ideal to replace 6V battery packs or equivalent loads. Can be combined in series or parallel arrangements for increased voltage or current. Ideal for use with motors or other solar products. Also available from FUTURLEC™ is a 9.0 V 70 mA Solar Cell, Part Code: SZGD8569, available at time of this writing for about 6 US dollars. Solar collection panels for all of the above commercial products are less than about 10 centimeters (cm, 1 cm=$10^{-2}$ meters) by 10 cm in area.

Rechargeable battery packs to be used in power source 105 with the solar cell or independently are commercially available, such as 1500 eneloop 4 Pack AA Ni-MH Pre-Charged Rechargeable Batteries with Charger from SANYO™ of PANASONIC CORPORATION OF NORTH AMERICA™ in Secaucus, N.J. Other suitable batteries and chargers are available from OPTIMA™ Batteries, Inc., of Milwaukee, Wis. In some embodiments, ultracapacitors are used to store and discharge energy very quickly. Ultracapacitors are commercially available, e.g., from MAXWELL TECHNOLOGIES, INC.™ of San Diego, Calif. Various solar charge controllers/battery chargers are available commercially, e.g., from SUNFORCE PRODUCTS INC. of Montreal, Canada.

Programmable microprocessors to serve as processor 103 are available commercially, and are programmed or otherwise configured to control power management and duty cycle times. In some embodiments, the device is controlled manually and processor 103 is omitted. Example commercially available programmable microprocessors to serve as processor 103 include K10_120: KINETIS™ K10 Baseline 120 MHz MCUs from FREESCALE SEMICONDUCTOR INC.™ of Austin, Tex. The Kinetis K10 MCU family includes 512 kilobytes (kB, 1 kB=$10^3$ bytes, 1 byte=8 binary digits, bits) to 1 megabyte (MB, 1 MB=$10^6$ bytes) of flash memory, a single precision floating point unit, and a NAND flash controller. The Kinetis K10 family is available in 144 LQF and 144 MAPBGA packages. Another example commercially available microprocessor is DFPIC1655X-RISC Microcontroller from Digital Core Design of Bytom, Poland. In some embodiments, the processor 103 is a mass-produced, custom-designed, small-footprint, low-cost and low-energy controller, as available for example from MOSAIC INDUSTRIES INC.™ of Newark, Calif.

Keypads with small liquid crystal display suitable as a user interface 107 are commercially available. For example, custom silicone rubber keypads and conductive rubber keypads can be ordered from NORTHPOINT TECHNOLOGIES, INC.™ of El Paso, Tex. Standard and custom LCD displays can be ordered from PHOENIX DISPLAY INTERNATIONAL, INC.™ of Tempe Ariz.

In some embodiments, a mobile, programmable telephone or computer in wireless communication with a communication port and processor on the apparatus is used at the user interface for the apparatus.

2.6 Wand Embodiment

A particular embodiment of the walking stick approach was implemented and called the wand embodiment. It utilizes four separate ultrasonic transducer components and it is capable of independently operating in single and dual frequency modes (40 kHz and 68 kHz), with continuous and pulsed operation modes. Each transducer is isolated from the moist environment in a "bellowed" metal container (soup can) to ensure longevity, low cost and high efficiency. The device can be turned on/off remotely using e.g. smartphones or computers. The device can be operated from 110V AC line. Additionally a 12V DC option is available using car batteries and/or a supercapacitor. The 40 kHz transducer is driven by fixed frequency driver while the 68 kHz transducer is driven by a limited self-tuning driver. Fully and dynamically self-tuning drivers deliver even higher efficiency. The ultrasonic sound waves emanating from the transducers were beam-shaped by a strategically positioned surface under the bottom of the bellowed cans to concentrate the sound power to the two-dimensional surface of the water body where the larvae are breathing.

The wand embodiment can be operated for duration of seconds to minutes to hours, with pulses of order of sub-seconds to tens of seconds, to hours. In general, pulsed-dual frequency operation mode is more effective than single frequency or continuous operating mode. This is likely due to more chaotic, more penetrating wave propagation feature in the applied volume, e.g. the lower probability of establishing quiet hidden, shadowed, or standing wave regions.

Figure 10A:
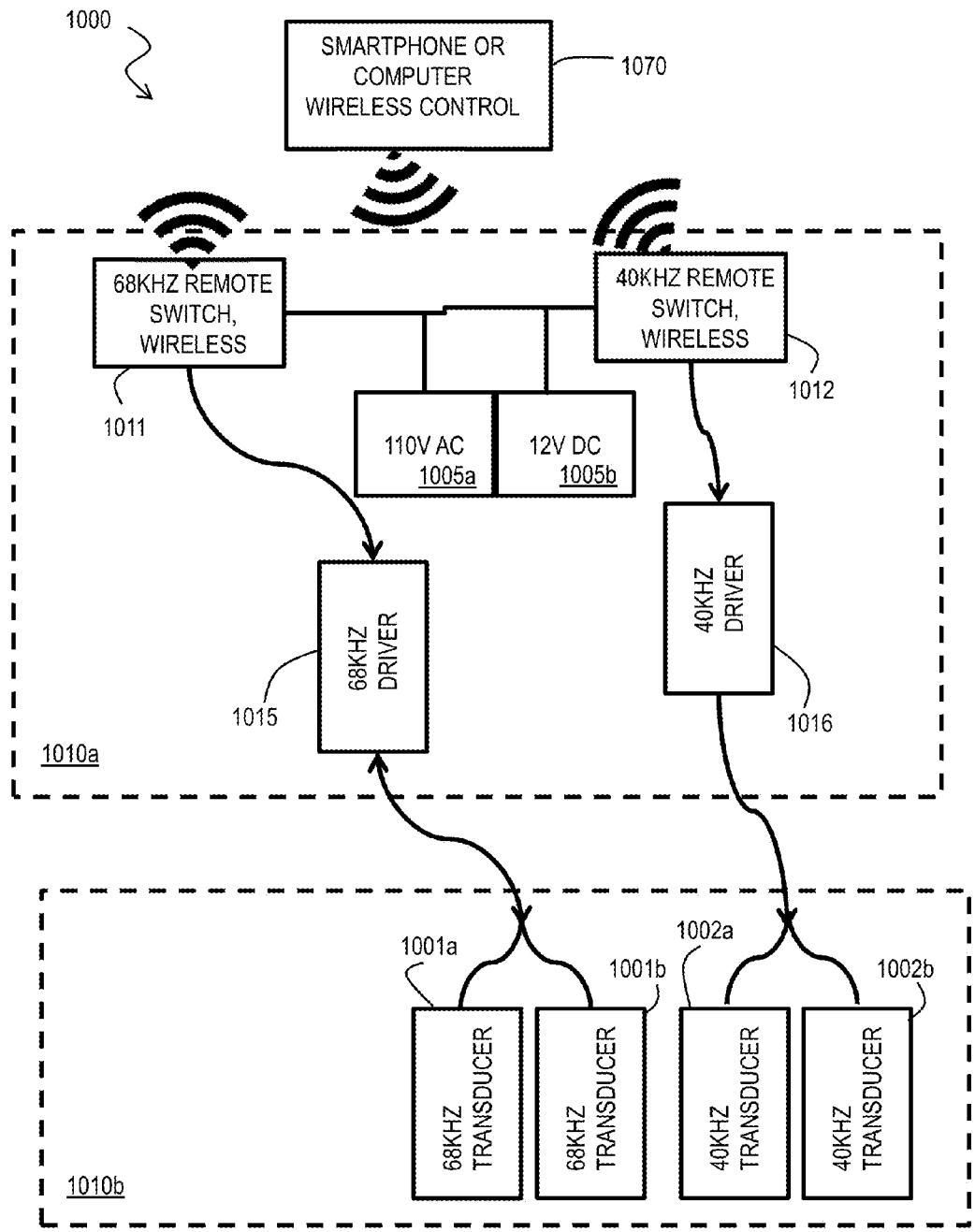
FIG. 10A to FIG. 10D are block diagrams that illustrate a wand system for cleansing organisms form water, according to one embodiment.

FIG. 10A to FIG. 10D are block diagrams that illustrate a wand system 1000 for cleansing organisms from water, according to one embodiment. As depicted in FIG. 10A, the system 1000 includes a computer or smartphone controller 1070 serving as wireless user interface device 107 and, at least in part, processor 103. Any wireless protocol may be used, including, in some embodiments BLUETOOTH™ technology. Attached to a support structure 1010a are multiple power sources 1005a, 1005b. In the illustrated embodiment, a 110 Volt (V) alternating current (AC) power source 1005a is included for plugging into a power grid socket. Also included is a 12 V direct current (DC) power source 1005b for connecting to a car battery or supercapacitor. Thus system 1000 may be powered by any of several different power sources.

For each frequency to be emitted by the system 1000, a wireless switch (e.g., wireless switches 1011, 1012 for the two frequencies 68 kHz and 40 kHz, respectively) is also attached to support structure 1010a, and controlled by wireless controller 1070. When a wireless switch is turned on, the corresponding ultrasound acoustic frequency driver is engaged (e.g., 1015, 1016, respectively for the frequencies 68 kHz and 40 kHz, respectively). In the illustrated embodiment, the drivers 1015 and 1016 are also attached to support structure 1010a. In other embodiments, more or fewer acoustic frequencies are emitted and corresponding switches and drivers are omitted or added.

In the illustrated embodiment, each driver drives two waterproof acoustic transducers. Thus transducers 1001a and 1001b are driven at 68 kHz by driver 1015; and, transducers 1002a and 1002b are driven at 40 kHz by driver 1016. The transducers 1001a, 1001b, 1002a and 1002b are attached to a second support structure 1010b, such as a wand that is easily moved into the bodies of water to be cleansed. Flexible wires connect the drivers on support structure 1010a to the transducers on support structure 1010b. In other embodiments, more or fewer transducers are driven by each driver.

In some embodiments, structure 1010a is configured to be worn as a backpack or shoulder bag. In some embodiments, the structure 1010a is itself attached to the support structure 1010b, e.g., support structure 1010a is configured to serve as a handle for a wand support structure 1010b.

Control by a smartphone or computer 1070 allows for data logging of treatments, including treatment time, treatment geographic location (e.g., GPS), and treatment parameters (e.g., duration, frequency, pulsing). This information is useful for flexible, responsive eradication efforts.

Figure 10B:
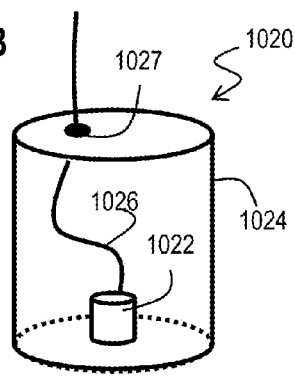

As depicted in FIG. 10B, an example waterproof transducer 1020 includes a can 1024 that can vibrate at the driven frequency to which is acoustically coupled on a bottom inside surface an ultrasound transducer 1022. The transducer 1022 is electrically connected to the driver through wire 1026 that passes outside the can 1024 at waterproof seal 1027. Thus, there is air inside the can and it is dry. In some embodiments, a canning machine is used to close the can hermetically and only penetrate through a waterproof connector. In other embodiments, water is allowed inside the can. In the illustrated embodiment, the top of the cans are sealed through a captured closed cell foam seal between two laser cut wood panels. In a preferred embodiment, the sides of the can are corrugated to form a kind of bellows that allows higher amplitude vibrational modes for less energy loss and for better acoustic coupling with the water medium outside the can. Such a can with corrugated sides is called a bellowed metal container herein.

Figure 10C:
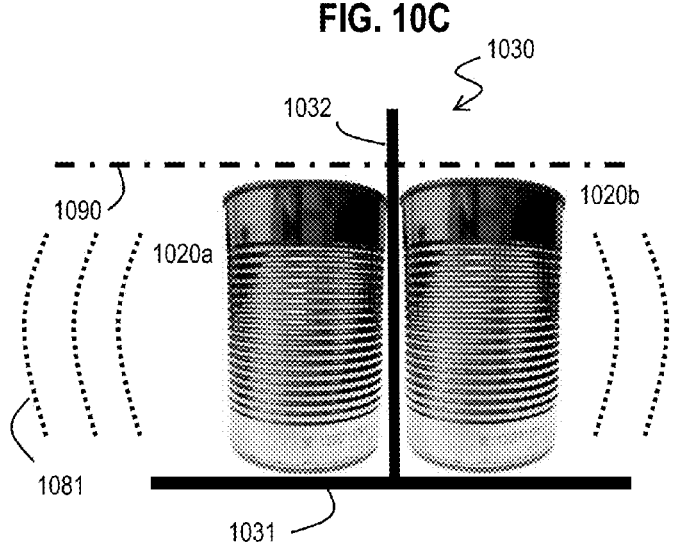
Figure 10D:
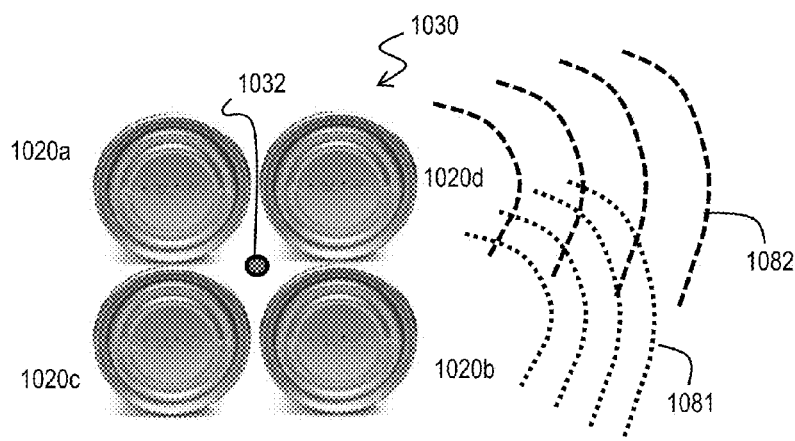

In the illustrated embodiment, two such waterproof transducers 1020a, 1020b are included for each of one or more frequencies, as depicted in FIG. 10C as transducer cluster 1030. In the illustrated embodiment, the waterproof transducers 1020a, 1020b show the corrugated sides of bellowed metal containers. The waterproof transducers are configured for deployment partially or completely below a water surface 1090 of a body of water. The system includes a rigid plate 1031 below the waterproof transducers to reflect acoustic waves and generate a primarily horizontal acoustic wave in the far field, as indicated by wave fronts 1081 traveling horizontally in FIG. 10C. A vertical post 1032 connects the rigid plate 1031 rigidly to the support structure 1010b. In an embodiment illustrated in the horizontal cross section of FIG. 10D, the pair of waterproof transducers 1020a and 1020b for one frequency are combined with a pair of waterproof transducers 1020c and 1020d for a different second frequency on opposite diagonals. The post 1031 is also depicted. The circularly spreading wave fronts in the horizontal plane at the two different frequencies are indicted schematically by dashed lines 1081 and 1082 to indicate the capacity of the peaks of one wave to occupy the troughs of the other, and thus reduce the occurrence or size of quiescent zones.

Figure 10E:
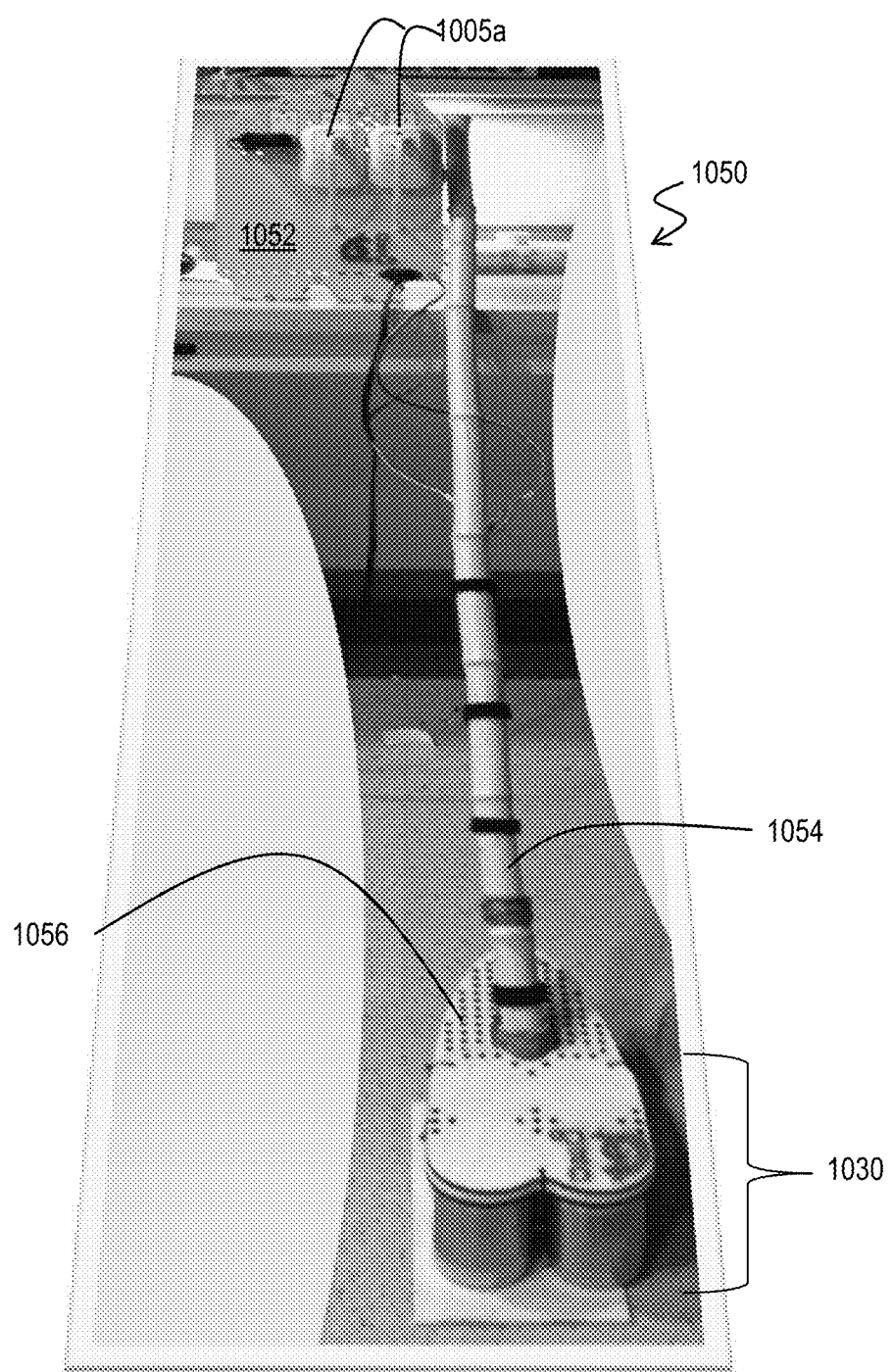
FIG. 10E is a photograph that illustrates an example wand system, according to an embodiment.

FIG. 10E is a photograph that illustrates an example wand system, according to an embodiment. The double pair of waterproof transducers are evident as cluster 1030. Also evident is pegboard 1052 serving as support structure 1010a, that can be placed in a rucksack or backpack, and pegboard 1056 and bamboo pole 1054 serving as support structure 1010b, the "wand." Two 110V AC power sources 1005a are evident on support structure 1052. It is also evident that support structures 1010a and 101b can be made with indigenous materials so that the system 1000 can be assembled from relatively small imported parts using plentiful and cheap materials and very little human time or effort.

In a set of experiments, the effect of the wand-type device was examined in a large, about 660 cm² surface area, flat bottom container. The results indicate high efficiency. In one of the experiments the 40 kHz and 68 kHZ frequencies were applied together for 10 second long pulses with a 10 second long spacing between pulses (total number of pulses=2, thus applying a total of 20 seconds of exposure over 30 seconds) resulted in 100% of larvae being killed, in a realistic model of large breeding puddles. The experiment was performed on 9-day-old larvae. Dead larvae were counted the day after applying ultrasound treatment, albeit high levels of instant eradication were apparent. In other experiments 40 kHz and 68 kHZ frequencies applied together for a single 20 second long pulse resulted in 97% of larvae killed in the 660 cm² area. The experiment was performed on 8- to 9-day-old larvae. Dead larvae were counted the day after applying ultrasound treatment, albeit instant eradication was also apparent.

Vendors for components for the depicted wand embodiment included the following: STEINER & MARTINS, INC.™, Miami, Fla. for STEMINC™ PIEZO SOLUTIONS (hereinafter STEMINC); Columbia BioOptics/GECo Group, New York, N.Y. (hereinafter CU); Belkin International, Inc.™, Playa Vista, Calif. (hereinafter Belkin). Components used include: STEMINC SMUG100W40ND ultrasonic-generator-100w-40-khz-asic; STEMINC SMUG200W2068ND ultrasonic-generator-200 w-adjustable-20-68-khz-asic; STEMINC SMBLTD45F40H bolt-clamped-langevin-tranducer-40-khz; STEMINC SMBLTD45F28H bolt-clamped-langevin-transducer-28-khz; Hermetic tin cans with bellows from Campbell soup company of Camden, N.J.; CU Laser-Cut frame, wiring, connectors, miscellaneous small parts; Belkin WeMo Switch F7C027fc.

3. PROCESSOR HARDWARE OVERVIEW

In some embodiments the processor 103 is implemented on a chip set or mobile telephone, or some combination. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. A sequence of binary digits constitutes digital data that is used to represent a number or code for a character.

Figure 11:
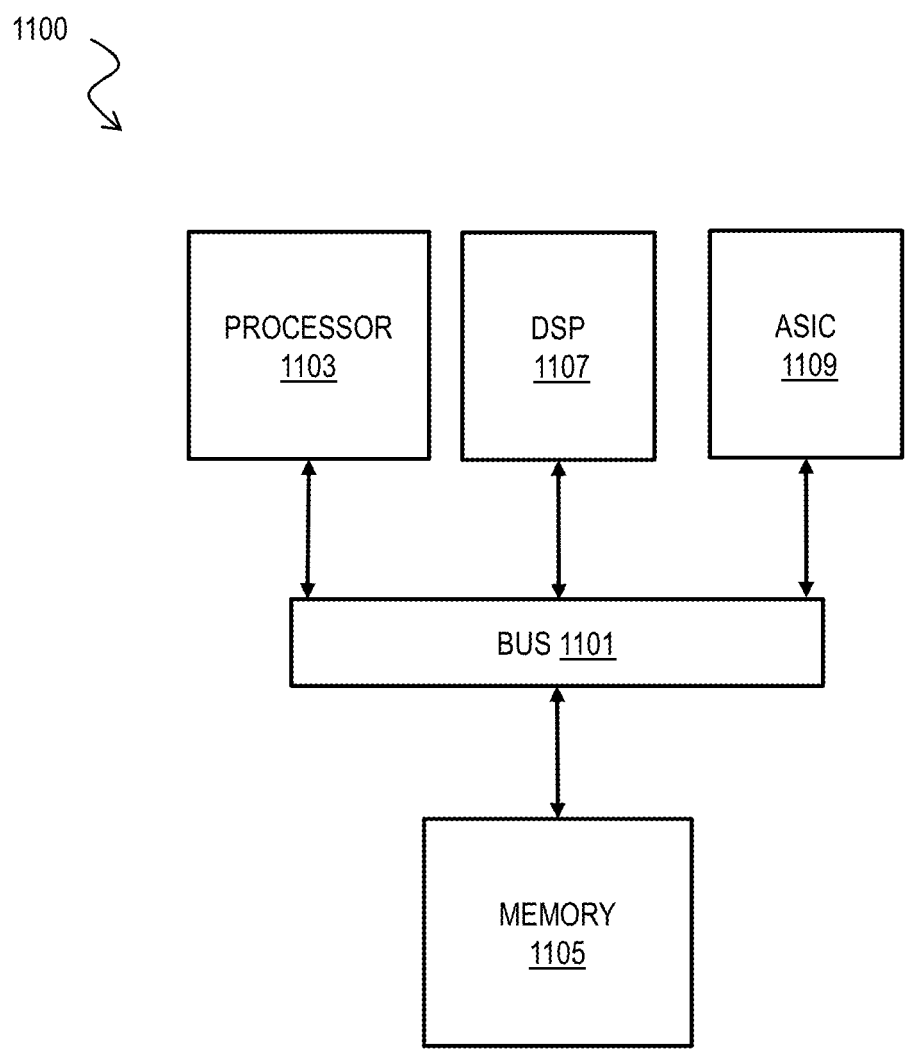
FIG. 11 illustrates a chip set upon which a portion of an embodiment of the invention may be implemented; and, FIG. 12 is a diagram of example components of a mobile terminal (e.g., handset) for communications, which is capable of operating in the system of FIG. 1, according to one embodiment.

FIG. 11 illustrates a chip set 1100 upon which an embodiment of the invention may be implemented. Chip set 1100 is programmed to perform one or more steps of a method described herein and includes, for instance, the processor and memory components incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1100, or a portion thereof, constitutes a means for performing one or more steps of a method described herein.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1105 also stores the data associated with or generated by the execution of one or more steps of the methods described herein.

Figure 12:
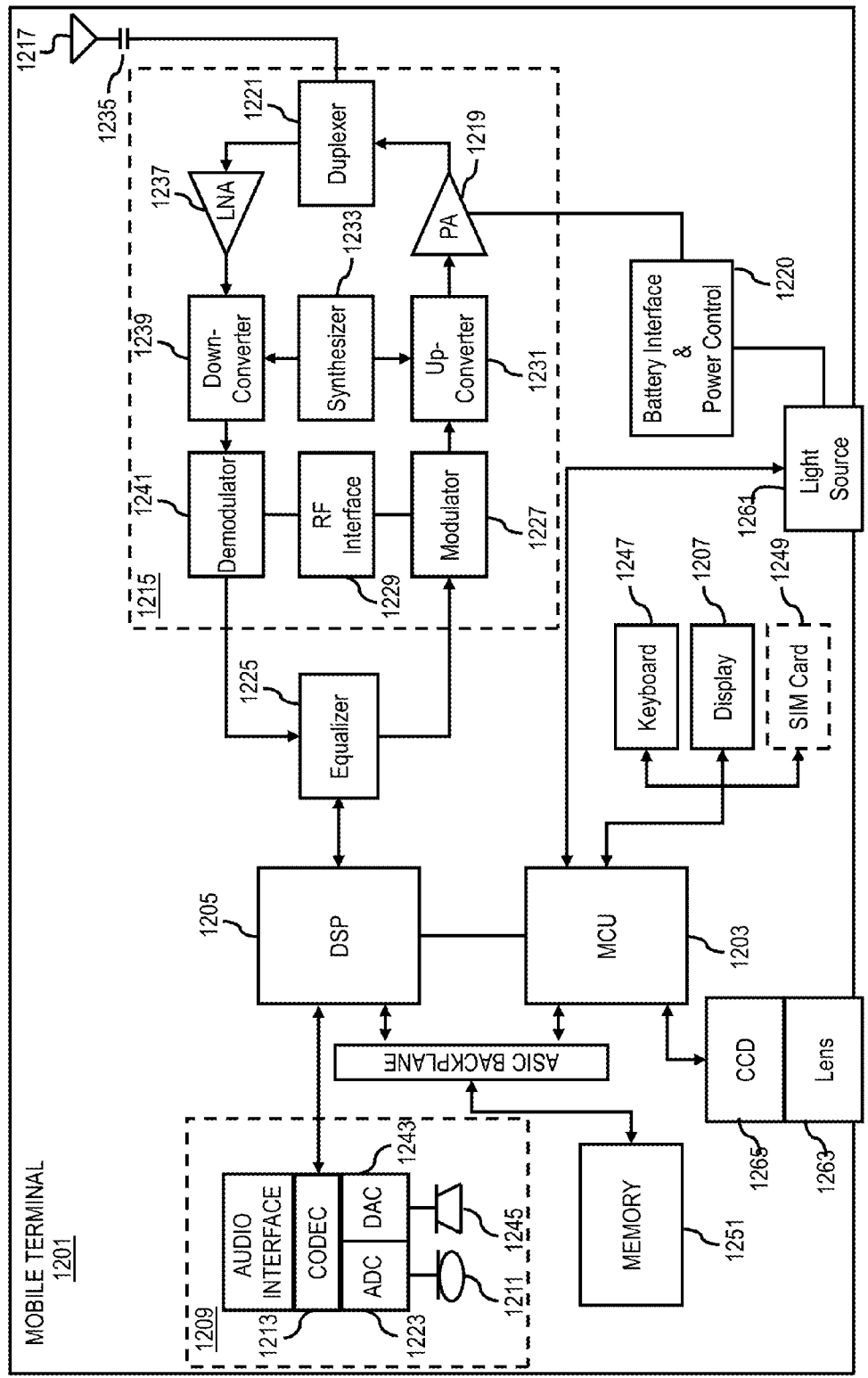

FIG. 12 is a diagram of example components of a mobile terminal (e.g., handset) 1201 for communications, which is capable of operating in the system of FIG. 1, according to one embodiment, e.g., as user interface 107. In some embodiments, mobile terminal 1201, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps as described herein. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 as described herein. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

In some embodiments, the mobile terminal 1200 includes a camera function, including a photosensitive array, e.g., charge coupled device (CCD) 1263, and in some embodiments either a lens 1263 or light source 1261 or some combination. In embodiments with the light sensitive array, data is transferred to the MCU 1203 and operation of the light source 1261 is controlled by the MCU 1203.

4. EXTENSIONS, ALTERATIONS, MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article.

REFERENCES

[1] S. Z. Child, C. H. Raeman, E. Walters, E. L. Carstensen, "The sensitivity of *Drosophila* larvae to continuous-wave ultrasound," *Ultrasound in Medicine & Biology*, Volume 18, Issue 8, Pages 725-728, 1992.

[2] S. Z. Child, E. L. Carstensen, "Effects of ultrasound on *Drosophila*—IV. Pulsed exposures of eggs," *Ultrasound in Medicine & Biology*, Volume 8, Issue 3, Pages 311-312, 1982.

[3] Sally Z. Child, Edwin L. Carstensen, Shung K. Lam, "Effects of ultrasound on *drosophila*: III. Exposure of larvae to low-temporal-average-intensity, pulsed irradiation," *Ultrasound in Medicine & Biology*, Volume 7, Issue 2, Pages 167-173, 1981.

[4] S. B. Barnett, G. R. Ter Haar, M. C. Ziskin, W. L. Nyborg, K. Maeda, J. Bang, "Review: Current status of research on biophysical effects of ultrasound," *Ultrasound in Medicine & Biology*, Volume 20, Issue 3, Pages 205-218, 1994.

[5] Wesley L. Nyborg, "Biological effects of ultrasound: Development of safety guidelines. Part II: General review," *Ultrasound in Medicine & Biology*, Volume 27, Issue 3, Pages 301-333, March 2001.

[6] Vu Sinh Nam, Nguyen Thi Yen, Brian H. Kay, Gerald G. Marten, And Janet W. Reid, "Eradication Of *Aedes Aegypti* From A Village In Vietnam, Using Copepods And Community Participation," *Am. J. Trop. Med. Hyg.*, 59(4), pp. 657-660, 1998.

[7] Lester Kok, "Mosquitoes vanish with zapping wand," *The Straits Times*, Saturday, Sep. 18, 2010, page D9.

What is claimed is:

1. A system for depleting insect larvae in a container of water comprising a non-waterproof control system electrically connected to a waterproof transducer configured for placement into a container of water without placement of the control system into the container, wherein the control system is configured to automatically operate the waterproof transducer for ensonifying the container of water with low intensity sound in a power concentration range from about 35 milliwatts per milliliter to 100 milliwatts per milliliter at one or more ultrasound frequencies in an acoustic frequency range from about 40 kilohertz to about 100 kilohertz for a duration in a range from 1 to 100 seconds.

2. A system as recited in claim 1, wherein the insect larvae are mosquito larvae.

3. A system as recited in claim 1, wherein the duration is about 20 seconds over a time interval from about 20 seconds to about 30 seconds.

4. A portable system for depleting target organisms in water comprising a support structure comprising a handle and a plate, a non-waterproof control system, and a plurality of waterproof transducers configured for ensonifying water in an acoustic frequency range from about 40 kilohertz to about 100 kilohertz for a duration in a range from about 1 to about 100 seconds, wherein the handle is disposed at a proximal portion of the support structure, the plate is disposed at a distal end of the support structure, the plurality of waterproof transducers are disposed on a proximal side of the plate and are electrically connected to the control system, and the support structure with waterproof transducers is handheld.

5. A system as recited in claim 4, wherein the waterproof transducers are configured for ensonifying the water at a first acoustic frequency of the acoustic frequency range and a different second acoustic frequency of the acoustic frequency range.

6. A system as recited in claim 5, wherein the first acoustic frequency is about 40 kilohertz and the second acoustic frequency is about 68 kilohertz.

7. A system as recited in claim 4, the system further comprising an alternating current power source and a direct charge power source.

8. A system as recited in claim 4, wherein each waterproof transducer comprises a bellowed metal container.

9. A system as recited in claim 4, wherein the duration is about 20 seconds over a time interval from about 20 seconds to about 30 seconds.

10. A system as recited in claim 4, wherein the control system causes the waterproof transducers to ensonify the water during a plurality of ten second pulses.

11. A system as recited in claim 10, wherein the plurality of ten second pulses are separated by intervals of about ten seconds without ensonification.

12. A system as recited in claim 4, further comprising a power source that comprises a solar cell.

13. A system as recited in claim 1, wherein the control system further comprises a power source that comprises a solar cell.

* * * * *